United States Patent
Verma et al.

(10) Patent No.: US 11,385,816 B2
(45) Date of Patent: Jul. 12, 2022

(54) SYSTEMS AND METHODS FOR IMPLEMENTING IMPROVED LINKS BETWEEN PATHS OF ONE OR MORE FILE SYSTEMS

(71) Applicant: Apple Inc., Cupertino, CA (US)

(72) Inventors: Vivek Verma, Sunnyvale, CA (US); Damien P. Sorresso, San Francisco, CA (US); Pavel Sokolov, Menlo Park, CA (US); Pierre-Olivier J. Martel, Mountain View, CA (US); Eric B. Tamura, Sunnyvale, CA (US); Yoni Baron, Haifa (IL)

(73) Assignee: Apple Inc.

( * ) Notice: Subject to any disclaimer, the term of this patent is extended or adjusted under 35 U.S.C. 154(b) by 208 days.

(21) Appl. No.: 16/879,432

(22) Filed: May 20, 2020

(65) Prior Publication Data
US 2020/0379662 A1 Dec. 3, 2020

Related U.S. Application Data

(60) Provisional application No. 62/855,803, filed on May 31, 2019.

(51) Int. Cl.
*G06F 3/06* (2006.01)

(52) U.S. Cl.
CPC ............ *G06F 3/0635* (2013.01); *G06F 3/064* (2013.01); *G06F 3/0614* (2013.01); *G06F 3/0653* (2013.01); *G06F 3/0659* (2013.01); *G06F 3/0673* (2013.01)

(58) Field of Classification Search
CPC .... G06F 3/0614; G06F 3/0623; G06F 3/0635; G06F 3/064; G06F 3/0644; G06F 3/0653; G06F 3/0659; G06F 3/0673
See application file for complete search history.

(56) References Cited

U.S. PATENT DOCUMENTS

| 7,587,570 | B2 * | 9/2009 | Sarkar | G06F 3/067 711/170 |
| 2017/0357657 | A1 * | 12/2017 | Garvey | G06F 3/0673 |

* cited by examiner

*Primary Examiner* — Larry T Mackall
(74) *Attorney, Agent, or Firm* — Dickinson Wright RLLP (57) ABSTRACT

Representative embodiments set forth herein disclose techniques for implementing improved links between paths of one or more file systems. According to some embodiments, techniques are disclosed for establishing a system volume and a data volume within a container. According to other embodiments, techniques are disclosed for establishing a link from a source path of a system volume within a container to a target path of a data volume within the container. According to yet other embodiments, techniques are disclosed for determining whether to allow a file system operation on a data volume of a container based on at least determining whether a target path is associated with a reference to a source path.

20 Claims, 7 Drawing Sheets

SYSTEMS AND METHODS FOR IMPLEMENTING IMPROVED LINKS BETWEEN PATHS OF ONE OR MORE FILE SYSTEMS

CROSS-REFERENCE TO RELATED APPLICATIONS

The present application claims the benefit of U.S. Provisional Application No. 62/855,803, entitled "SYSTEMS AND METHODS FOR IMPLEMENTING IMPROVED LINKS BETWEEN PATHS OF ONE OR MORE FILE SYSTEMS," filed May 31, 2019, the content of which is incorporated herein by reference in its entirety for all purposes.

FIELD

The described embodiments relate generally to file systems within computing devices. More particularly, the described embodiments relate to implementing improved links between paths of one or more file systems that are included in a container within the same storage device.

BACKGROUND

A modern computing device typically includes a main storage device (e.g., a hard disk drive, a solid state drive, etc.) that is separated into multiple partitions, where each partition includes a single file system that serves a particular purpose with respect to the operation of the computing device. For example, an operating system (OS) partition can include an OS file system for executing a main OS, a user partition can include a user file system for storing user files (e.g., documents, media data, etc.), a recovery partition can include a recovery file system for carrying out a recovery procedure (e.g., a restoration of the main OS), and the like. In this configuration, a basic input/output system (BIOS) of the computing device, when powered-on, reads and then executes the OS files in the OS partition to cause the OS to properly initialize and execute on the computing device.

In some cases, various links between may be created between resources in a file system or in several file systems. A link may refer to one path in a file system pointing to another path in the same file system or different file system. For example, a symbolic link (symlink) is a file that contains a reference to another file or directory in the form of an absolute or relative path. A hardlink may be a directory entry that associates a name with a file on a file system. Hardlinks may be used such that two or more paths point to the same resource.

SUMMARY

Accordingly, representative embodiments set forth herein disclose various techniques for implementing dynamic file system volumes that can share storage space with other file system volumes within the same partition/storage device.

According to some embodiments, a method for establishing a system volume and a data volume within a container, the method can include the steps (1) receiving a request to establish the system volume and the data volume within the container, (2) determining that the system volume and the data volume are associated with a specific volume group, where the specific volume group defines an exclusive relationship between the system volume and the data volume within the container, (3) assigning a data role to the data volume and a system role to the system volume based on the exclusive relationship defined by the specific volume group, and (4) establishing the system volume having the system role and the data volume having the data role within the container.

Other embodiments include a method for establishing a link from a source path of a system volume within a container to a target path of a data volume within the container, the method may include the steps of (1) receiving a request to establish the link from the source path of the system volume to the target path of the data volume within the container, (2) storing an attribute with the source path in the system volume that indicates the source path of the system volume is the link to the target path of the data volume, (3) storing a reference from the target path in the data volume to the source path in the system volume, and (4) verifying an origination of a request to perform an operation using the reference and the attribute.

Yet other embodiments include a method for determining whether to allow a file system operation on a data volume of a container, the method may include the steps of (1) receiving a request to perform the file system operation at a target path of the data volume within the container, (2) determining whether the target path is associated with a reference to a source path in a system volume of the container, and (3) responsive to determining that the target path is associated with the reference to the source path, determining whether the source path comprises an attribute that indicates the source path in the system volume is a link to the target path in the data volume.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In some instances, certain computing devices implement a large monolithic OS including a writable file system volume with OS files and user data files. However, using a large monolithic OS may make it difficult to achieve certain security goals for the computing device. For example, the large monolithic OS may provide an easier target for malicious users and/or systems to infiltrate with malware since the OS files are commingled with the user files in a single writable volume. For example, if a user got access to a root directory of the writeable file system, a malicious user and/or system may install malware that is hard to detect and/or remove, thereby potentially compromising the computing device.

Accordingly, aspects of the present disclosure set for a technique for separating a system volume including OS files and a data volume include user files within a container of a storage device of a computing device. A container may represent a logical entity that encompasses volumes. The system volume may be read-only and immutable during normal use, while the data volume may be read-write and mutable. In some instances, such as during an OS update, the system volume may be writable to enable a preapproved and vetted installation package to replace and/or update the OS files in the system volume.

It is noted that separating a single volume into two volumes means that there are different paths for directories and/or files in each of the two volumes. A computing device on which such a file structure including separate system volumes and data volumes is to be established may include legacy applications that were installed when the computing device was using the large monolithic OS. The paths that were previously being used by the legacy applications should still be referenced by the legacy applications without the application having to make any changes after the new file structure with the separate system volumes and data volumes is installed. As such, a mechanism to link a path that was previously being used by a legacy application to a new path is desired.

Conventionally, hardlinks may be used to create an additional name for an existing file. However, hardlinks suffer from not being able to cross volume boundaries. Conventional symlinks may include a file that references another file at a different location, and symlinks overcome the deficiency of hardlinks by being able to cross volume boundaries. However, symlinks also include a weakness in that, once an application (e.g., OS) arrives at a target path for an operation request, there is not a mechanism to determine from where the operation request originated. For example, if an application requests to perform an operation including path "/application", and "/application" is a symlink to "/local application", then "/local application" may replace the "/application" in the request and be sent to the OS. The OS may receive the request including "/local application" and be unable to determine an origination of the request. That is, there is no mechanism to determine that the operation request arrived at the target path "/local application" via a symlink on the source path "/application". Thus, the OS cannot verify that the operation request is secure and/or what the intent of the request was, thereby rendering symlinks an insufficient type of link to use in computing devices where security is important.

Accordingly, aspects of the present disclosure relate to establishing the system volume and the data volume in a container in a secure way using improved links (e.g., referred to as "firmlinks" herein) that provide bi-directional references between source paths in the system volume and target paths in the data volume. Firmlinks may refer to an abstraction that enables crossing volume boundaries and determining that a target path in an operation request is associated with a source path that is an approved firmlink. Using the firmlinks may enable allowing legacy applications to reference the same paths for file operations after the file structure including the system volume and the data volume is installed on computing devices. That is, the firmlinks enable binary compatibility with existing legacy applications that are installed on a computing device. Further, the firmlinks enable this backward compatibility in a secure manner. For example, the firmlinks can be used by the OS in a sandbox mode prior to allowing the performance of any requested operation to verify that target paths in the received requests are associated with source paths in the system volume. Further, the OS can verify that the source path is a firmlink based on identifying one or more attributes stored with the source path that indicate the source path is a firmlink to the target path.

To implement the techniques described herein, the OS kernel and the file system may cooperate to establish the various system volumes and data volumes in a container and to establish the firmlinks. For example, while installing the file system, the OS may be informed by a volume manager of a container that there are certain volume groups associated with the volumes of that container. In some embodiments, each container may include a volume manager that represents combination of logic (e.g., an Application Programming Interface (API)) as well as information for managing various aspects of the operation of the container in which the volume manager is included. For example, the volume manager can be used to cause the OS to create, modify, and delete volumes within the container based on metadata of the volumes. Moreover, the volume manager may cause the OS to establish the firmlinks in the system volume and/or the data volume based on attributes stored with paths in the system volume and/or data volume.

The volume groups may be stored in metadata for the volumes. A volume group may refer to an exclusive relationship defined between a specific system volume and a specific data volume. For example, if a system volume and a data volume share the same volume group that means that the system volume and the data volume are a pair that is useable to run an instance of an OS to which the system volume and the data volume are associated. The volume group may specify to assign a system role to the system volume and a data role to the data volume. The system role may at least specify that the system volume is read-only and the data role may at least specify that the data volume is read-write. That system volume and that data volume are the only two volumes allowed to have those roles for a particular instance of an OS. There may be one or more other pairs of system volumes and data volumes that are related within a container based on different respective volume groups. These one or more other pairs may represent different respective instances of an OS to which those system volumes and data volumes are associated (e.g., there may be two, three, four, etc. instances of macOS on the computing device).

The OS may determine an order for establishing (e.g., mounting) the system volumes and the data volumes using at least the volume groups. For example, the OS may establish a system volume prior to establishing a data volume and may determine to initially establish a first system volume in a first volume group and then establish a first data volume in the first volume group. Next, the OS may determine to establish a second system volume in a second volume group and then establish a second data volume in the second volume group, and so forth.

The OS may create firmlinks in the system volume and/or the data volume by storing one or more attributes for the source paths in the system volume and/or the target paths in the data volume. For example, an attribute is stored with the source path to indicate it is a firmlink. Another attribute may be stored with the source path to indicate that the source path leads to a particular target path in the data volume. The attributes represent that the source path in the system volume and the target path in the data volume are a pair.

During runtime, the OS may traverse the firmlinks by identifying which source paths are firmlinks in the system volume and identifying the particular volume group to which the system volume belongs. The OS may identify the data volume that is also associated with that particular volume group. The OS may search the data volume in the volume group to find the target path to which the source path in the system volume leads. The OS may store (e.g., in memory) references (e.g., pointers) from the source path in the system volume to the target path in the data volume, and from the target path in the data volume to the source path in the system volume. Thus bi-directional references between source paths and target paths are maintained for the improved firmlinks.

Once the file system including the source volume(s) and/or data volume(s) are established and the firmlinks are established. The OS may execute one or more applications. A legacy application may make a request using the path that it knew prior to the disclosed techniques being implemented and the request may be allowed to perform in a secure manner. For example, the OS may receive a request to perform an operation at path "/application". The OS may search the system volume and identify "/application" is a source path that is a firmlink (e.g., based on the attribute(s)) leading to a target path "/local application" in the data volume sharing the same volume group as the system volume. The OS may use the target path "/local application" instead of "/application" in the request.

In some embodiments, the OS may receive a request from applications and/or frameworks for the path of the target path (e.g., "/local applications/Mail.app") in the data volume. The OS may report the path as if the path is the source path (e.g., /applications/Mail.app") to the requesting applications and/or frameworks. For example, the OS may search the data volume and identify, based on the reference, that "/local application/Mail.app" has a target path "/local application" that is associated with a firmlink at source path "/application" in the system volume sharing the same volume group as the data volume. The OS may report the path as including the source path "/application/Mail.app" to any applications and/or frameworks that inquire about such information.

Prior to allowing the operation to execute using the target path in the data volume of the container, the OS may perform a security measure in the sandbox mode by determining if the request arrived at the target path from a source path and if that source path is a firmlink. For example, the OS may determine that the target path is associated with a particular source path based on the references maintained in memory. Further, the OS may analyze the source path and determine whether the source path is a firmlink based on the attributes of the source path. If the source path is a firmlink, the OS may allow the operation to be performed. If the source path is not a firmlink, the OS may prevent the operation from being performed. Accordingly, the disclosed firmlinks enable crossing volume boundaries between separate system volumes and data volumes in a secure manner by using bi-directional references between source paths and target paths to enhance the security of files maintained.

Figure 1:
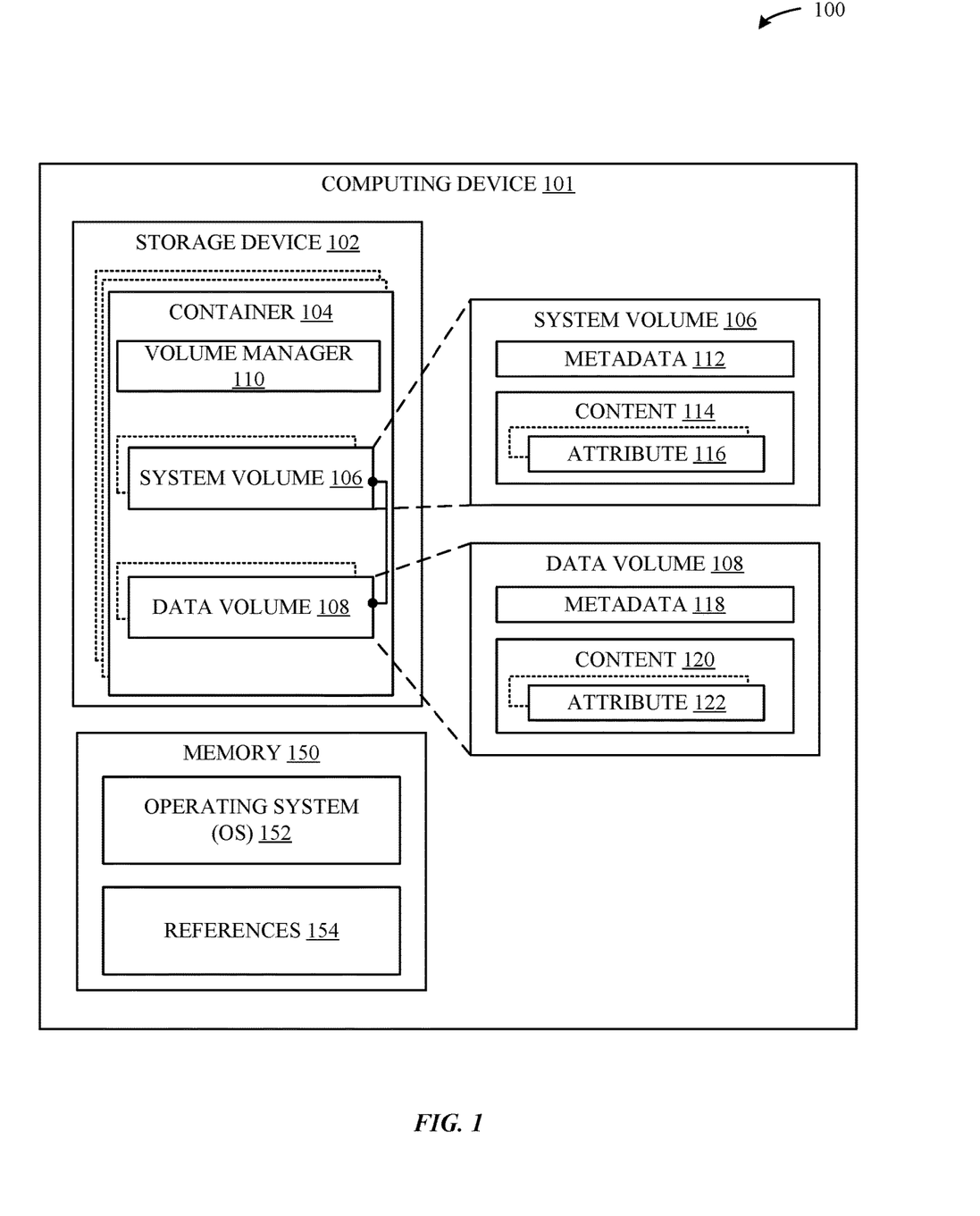
FIG. 1 illustrates a system diagram of a computing device that can be configured to perform the various techniques described herein, according to some embodiments.

FIG. 1 illustrates a system 100 of a computing device 101 that can be configured to perform the various techniques described herein, according to some embodiments. The computing device 101 can represent a smartphone, tablet, laptop, desktop, display, watch, media player, or any other suitable computing device. As shown in FIG. 1, the computing device 101 can include a storage device 102, which can represent a hard disk drive, a solid state drive, a combination of drives, and the like. As also shown in FIG. 1, the computing device 101 can include a memory 150 into which an operating system (OS) 152/various user applications (not illustrated in FIG. 1) can be loaded and executed by a processor (also not illustrated in FIG. 1) to perform the various techniques described herein. References 154 can be also loaded in the memory 150 during runtime, as described above.

According to some embodiments, the storage device 102 can be configured to include a container 104, where the container 104 represents a logical entity that encompasses one or more system volumes 106 and data volumes 108. More specifically, and as illustrated in FIG. 1, each container 104 can be configured to include a volume manager 110. According to some embodiments, the volume manager 110 represents a combination of logic (e.g., an Application Programming Interface (API)) as well as information for managing various aspects of the operation of the container 104 in which the manager 110 is included. For example, the volume manager 110 can be utilized (e.g., by the OS 152—or other entity executing at the computing device 101/connected to the computing device 101) to create, modify, and delete system volumes 106 and data volumes 108 within the container 104 by informing the OS 152 of various aspects related to the system volumes 106 and data volumes 108. Further, the volume manager 110 can be utilized (e.g., by the OS 152—or other entity executing at the computing device 101/connected to the computing device 101) to create, modify, and/or delete firmlinks in the system volume 106 and/or the data volume 108.

According to some embodiments, and as shown in FIG. 1, each system volume 106 can be configured to include metadata 112 and content 114. Further, each data volume 108 can be configured to include metadata 118 and content 120. According to some embodiments, the metadata 112 and 118 can store information about the system volume 106 and data volume 108, respectively. For example, the metadata 112 and 118 may be stored in a data structure referred to as a superblock (e.g., 4K) for the system volume 106 and the data volume 108. The metadata 112 for the system volume 106 may store information about a volume group of the system volume 106 (e.g., volume group defines an exclusive relationship with a data volume that is in the same volume group), a volume group role (e.g., system role), type of the volumes, encryption schemes (if any) that are implemented within the volumes, information about the content 114, and the like. The metadata 118 for the data volume 108 may store information about a volume group of the data volume 108 (e.g., volume group defines an exclusive relationship with a system volume that is in the same volume group), a volume group role (e.g., data role), type of the volumes, encryption schemes (if any) that are implemented within the volumes, information about the content 120, and the like.

According to some embodiments, the content 114 and 120 stores information about the actual data of the system volume 106 and data volume 108, respectively, e.g., files, directories, and the like. For example, the content 114 and 120 can include various data structures (e.g., tables, trees, lists, etc.) that define a manner in which the various files, directories, etc. are related to one another and hierarchically organized. Moreover, the various data structures can include information pertaining to the storage locations of the various files, directories, etc., within the storage device 102, e.g., physical storage block addresses, offsets, and the like. Additionally, the content 114 and/or 120 may include various attributes 116 and/or 122 stored with the content 114 and/or 120. For example, the attribute 116 may indicate that a particular source path in the system volume 106 is a firmlink, and another attribute 116 may indicate the target path in the data volume 108 to which the firmlink leads. In some embodiments, a single attribute may be used to indicate that the source path is a firmlink to a target path in the data volume 108.

In some embodiments, the container 104 may be configured to establish multiple system volumes 106 and data volumes 108. For example, the volume group of each system volume 106 may be determined and the OS 152 may identify a data volume 108 that has a matching volume group. The system volume 106 may be assigned the system role and the data volume 108 may be assigned the data role in the pair. Each pair of system volumes 106 and data volumes 108 may represent a separate instance of an OS to which the pair is associated. The system volumes 106 may be read-only and the data volumes 108 may be read-write.

Figure 2:
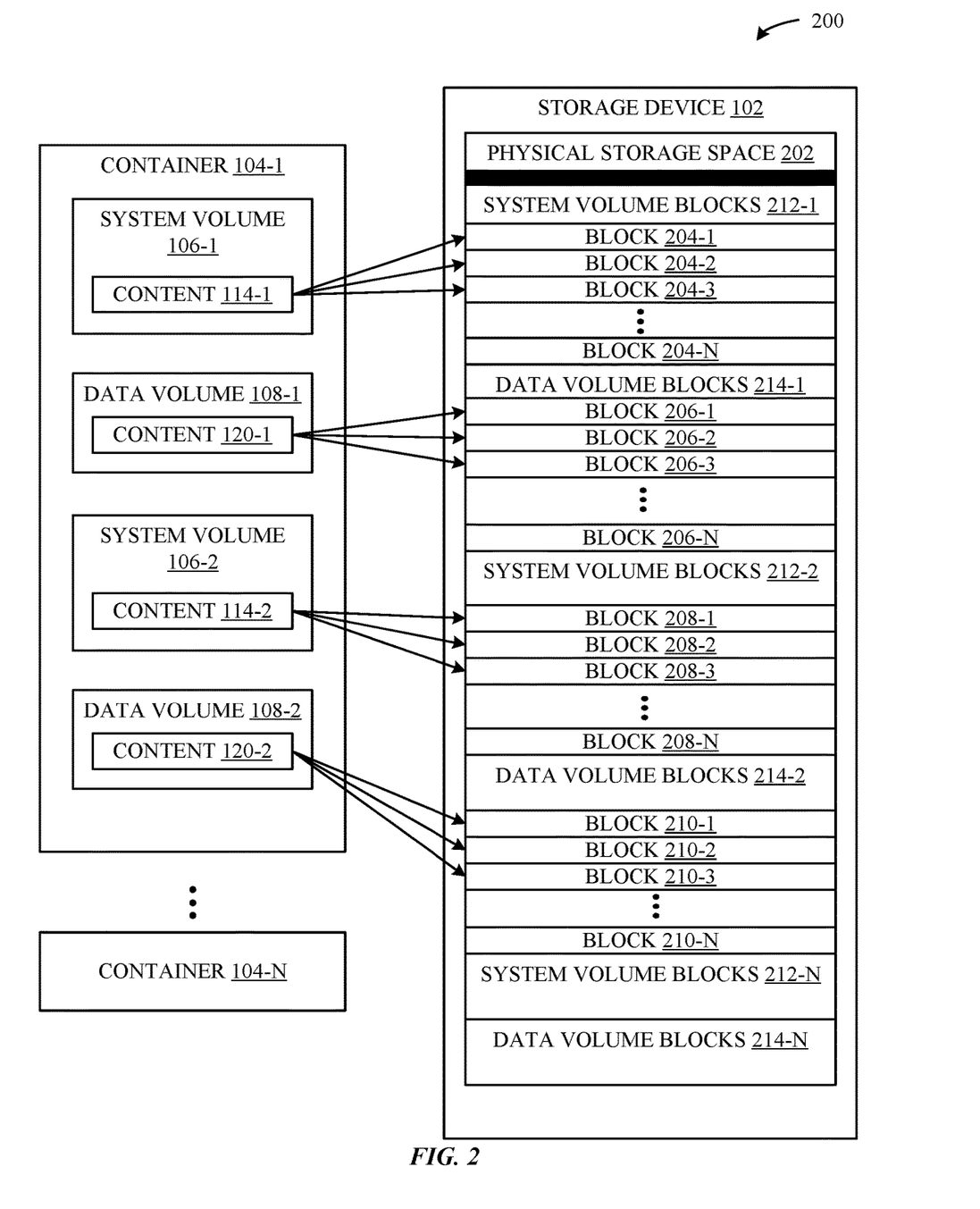
FIG. 2 illustrates a conceptual diagram of an example scenario of different containers including volumes established within a storage device of the computing device of FIG. 1, according to some embodiments.

FIG. 2 illustrates a conceptual diagram 200 of an example scenario of different containers 104 including volumes (e.g., system volumes 106 and data volumes 108) established within a storage device 102 of the computing device 101 of FIG. 1, according to some embodiments. It is noted that the example scenario illustrated in FIG. 2 is merely exemplary and that any number of containers 104, system volumes 106, and/or data volumes 108 can be established within the storage device 102 to meet different configuration requirements of the computing device 101. For example, the storage device 102 can include only a single container 104, where the single container 104 can be configured to include one or more system volumes 106 and one or more corresponding data volumes 108. In another example, the storage device 102 can include multiple containers 104 that include one or more system volumes 106 and one or more data volumes 108. Moreover, the one or more system volumes 106 and/or data volumes 108 can be configured to implement different encryption schemes as the metadata 112, 118/content 114, 120 of each system volume 106 and data volume 108 is logically separated from the other system volume 106 and data volume 108. Accordingly, the techniques described herein can be utilized to establish any number of containers 104 including any number of system volumes 106 and data volumes 108 to meet different operational requirements.

The portions of the storage device 102 used for the system volume(s) 106 may be read-only and the portions of the storage device 102 used for the data volume(s) 108 may be read-write. As shown in the example scenario illustrated in FIG. 2, the storage device 102 includes multiple blocks 204-1 through 204-N, 206-1 through 206-N, 208-1 through 208-N, and 210-1 through 210-N within physical storage space 202, where each block represents a physical storage block (i.e., a contiguous sequence of bytes/bits) within the storage device 102. As further shown in FIG. 2, a first container 104-1 is assigned to the blocks 204-1 through 204-N, 206-1 through 206-N, 208-1 through 208-N, and 210-1 through 210-N. For example, the first container 104-1 includes a first system volume 106-1, where the content 114-1 of the first system volume 106-1 is stored across system volume blocks 212-1 (e.g., block 204-1 through block 204-3) within the physical storage space 202. Similarly, the first container 104-1 includes a first data volume 108-1, where the content 120-1 of the first data volume 108-1 is stored across data volume blocks 214-1 (e.g., block 206-1 through block 206-3) within the physical storage space 202. Moreover, the first container 104-1 includes a second system volume 106-2, where the content 114-2 of the second system volume 106-2 is stored across system volume blocks 212-2 (e.g., block 208-1 through block 208-3) within the physical storage space 202. Also, the first container 104-1 includes a second data volume 108-2, where the content 120-2 of the second data volume 108-2 is stored across data volume blocks 214-2 (e.g., block 210-1 through block 210-3) within the physical storage space 202. It is noted that the content 114-1, 120-1, 114-2, and 120-2 can be stored across different blocks in an interleaved/non-contiguous fashion, such that the different system volumes 106 and data volumes 108 can share storage space in a flexible manner.

Additionally, additional containers 104 may be allocated blocks to establish additional system volumes 106 and additional data volumes 108 in the additional containers 104 in a similar fashion as described above. It is noted that the example scenario illustrated in FIG. 2 is merely exemplary and that any number of containers 104, system volumes 106, and data volumes 108 can be established within the storage device 102 to meet different configuration requirements of the computing device 101.

In view of the foregoing, FIG. 1 sets forth the computing device 101 that can be configured to perform the various techniques described herein, according to some embodiments. Moreover, FIG. 2 illustrates the conceptual diagram 200 of an example scenario of different containers 104/ system volumes 106/data volumes 108 established within the storage device 102 (of the computing device 101) of FIG. 1, according to some embodiments. Accordingly, FIG. 3 illustrates a conceptual diagram of an example scenario of establishing a link from a source path in a system volume to a target path in a data volume established within a storage device 102 of the computing device 101 of FIG. 1, according to some embodiments.

Figure 3:
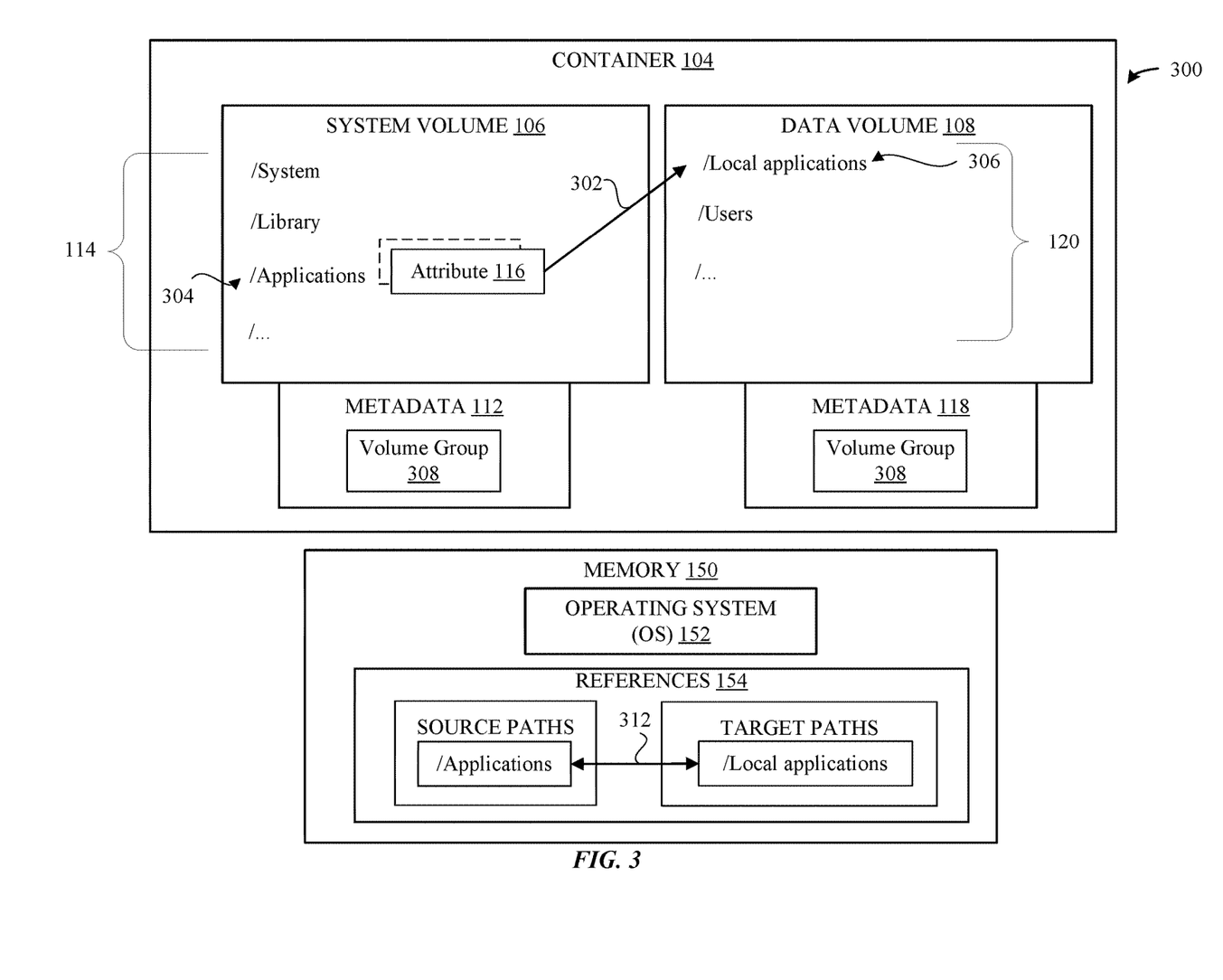
FIG. 3 illustrates a conceptual diagram of an example scenario of establishing a firmlink from a source path in a system volume to a target path in a data volume established within a storage device of the computing device of FIG. 1, according to some embodiments.

FIG. 3 illustrates a conceptual diagram 300 of an example scenario of establishing a firmlink 302 from a source path 304 in a system volume 106 to a target path 306 in a data volume 108 established within a storage device 102 of the computing device 101 of FIG. 1, according to some embodiments. The system volume 106 and the data volume 108 may be established as described above and further with reference to FIG. 4. For example, the OS 152 may determine that the system volume 106 and the data volume 108 are a pair based on being included in the same volume group 308. The volume group 308 may be identified in metadata 112 and 118 for the system volume 106 and the data volume 108, respectively. The OS may have assigned a system role to the system volume 106 and a data role to the data volume 108 based on the exclusive relationship defined in the volume group 308. The OS may store the content 114 in the system volume 106 and the content 120 in the data volume 108. The content 114 for the system volume 106 includes directories: "/System", "Library", "Applications", and so forth. The content 120 for the data volume 108 includes directories: "/Local applications", "Users", and so forth.

As depicted, the source path 304 is "/Applications" in the system volume 106 and the target path 306 is "/Local applications". The OS 152 stored one or more attributes 308 with the source path 304 in the system volume 106. One of the attributes 308 may indicate that the source path 304 is a firmlink 302, and another attribute 116 may indicate that the firmlink 302 leads to the target path 306. There may be multiple different source paths that are enumerated as firmlinks. The source paths may be directories, files, and the like.

During runtime, the OS 152 may identify the source path 304 as the firmlink 302. Further, the OS 152 may determine that the data volume 108 is paired with the system volume 106 in which the firmlink 302 is established based on the volume group 308. The OS 152 may search the data volume 108 for the target path 306 to which the firmlink 302 points. As depicted, the OS 152 may create and store a reference 154 from the source path 304 to the target path 306 and a reference 154 from the target path 306 to the source path 304. That is, the OS 152 may store bi-directional references 154 (as depicted by arrow 312) between the source path 304 and the target path 306 in the memory 150. In some embodiments, the source path 304 and the target path 306 may be virtual nodes (vnodes) in a virtual file system maintained by the OS 152 and the references 154 may be pointers.

In some embodiments, when the OS 152 receives a request to perform an operation at the target path 306, the OS 152 may perform a security measure in a sandbox mode to determine at which source path, if any, the request originated and whether the source path is trusted. To accomplish this, the OS 152 may determine whether the target path 306 ("/Local applications") is associated with any references 154 in the memory 150. The OS 152 may determine that the target path 306 is associated with a reference to the source path 304 ("/Applications"). The OS 152 may determine whether the source path 304 is a firmlink 302 by analyzing the attributes 116 of the source path 304. The OS 152 may determine that the source path 304 is the firmlink 302 based on the attributes 116 indicating such. Since the source path 304 is a firmlink 302, the OS 152 may allow performance of the operation and/or may perform the operation.

Figure 4:
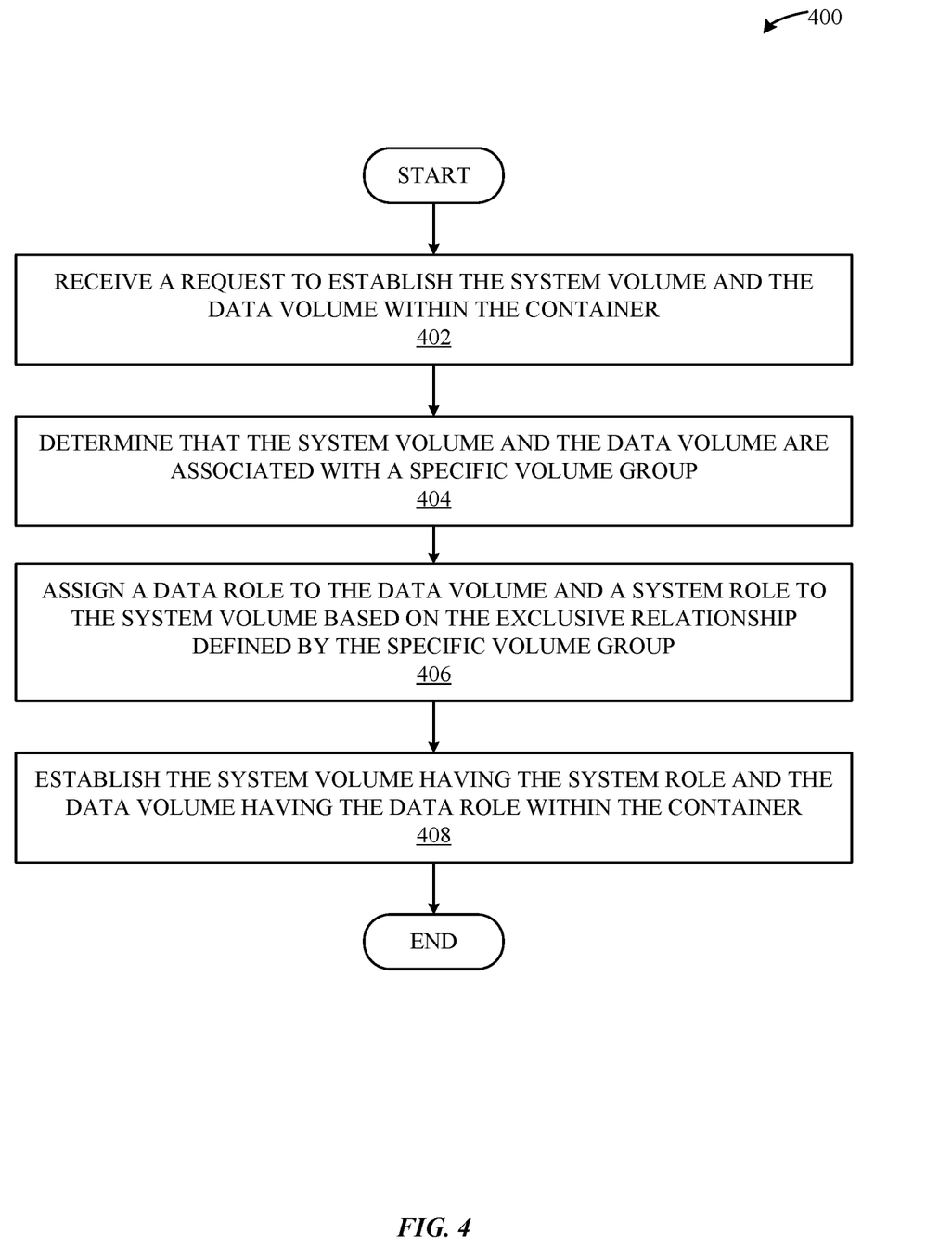
FIG. 4 illustrates a method for establishing a system volume and a data volume within a container within the storage device of the computing device of FIG. 1, according to some embodiments.

FIG. 4 illustrates a method 400 for establishing a system volume and a data volume within a container within the storage device of the computing device of FIG. 1, according to some embodiments. In the following description, the method 400 is carried out by an entity that is executing on the computing device 101, e.g., the OS 152. However, it is noted that other entities can be configured to carry out the method 400 without departing from the scope of this disclosure, e.g., a bootstrap OS executing on the computing device 101, an external entity configured to communicate with the computing device 101, the volume manager 110, and the like.

As shown in FIG. 4, the method 400 begins at step 402, where the OS 152 receives a request to establish a system volume 106 and a data volume 108 within a container 104. At step 404, the OS 152 determines that the system volume 106 and the data volume 108 are associated with a specific volume group 308. The OS 152 may identify the specific volume group 308 in a respective superblock (e.g., metadata 112 and 118) of the system volume 106 and the data volume 108. The specific volume group 308 may define an exclusive relationship between the system volume 106 and the data volume 108 within the container 104. The volume group 308 may also specify roles for the system volume 106 and the data volume 108. For example, the volume group 308 may indicate that the system volume 106 has a system role and the data volume 108 has a data role. The system role may at least indicate that the system volume 106 is read-only, and the data role may indicate that the data volume 108 is read-write. In some embodiments, no other system volume or data volume can be assigned these roles for this volume group 308, hence the exclusionary nature of the relationship defined by the volume group 308. Accordingly, the system volume 106 and the data volume 108 pair represent a particular instance of an OS within the container 104.

At 406, the OS 152 assigns the data role to the data volume and the system role to the system volume based on the exclusive relationship defined by the specific volume group. At 408, the OS 152 establishes the system volume 106 having the system role and the data volume 108 having the data role within the container 104.

There may be many other pairs of system volumes and data volumes based on other volume groups that represent other instances of the OS within the container 104. For example, in some embodiments, the OS 152 may receive a second request to establish a second system volume 106-2 and a second data volume 108-2 within the container 104. The OS 152 may determine that the second system volume 106-2 and the second data volume 108-2 are associated with a second specific volume group. The second specific volume group defines a second exclusive relationship between the second system volume 106-2 and the second data volume 108-2 within the container 104. The OS 152 may assign a second data role to the second data volume 106-2 and a second system role to the second system volume 106-2 based on the second exclusive relationship defined by the second specific volume group 106-2. The OS 152 may establish the second system volume 106-2 having the second system role and the second data volume 108-2 having the second data role within the container 104.

In some embodiments, the OS 152 may receive a request to establish a link 302 (e.g., firmlink) from a source path 304 of the system volume 106 to a target path 306 of the data volume 108 within the container 104. The OS 152 may store an attribute 116 with the source path 304 in the system volume 106 that indicates the source path 304 of the system volume 106 is the link 302 to the target path 306 of the data volume 108. The OS 152 may also store a reference 154 from the target path 306 in the data volume 108 to the source path 304 in the system volume. The reference 154 may be created at runtime and stored in the memory 150.

After the link 302 is enumerated, the OS 152 may receive a request to perform a file system operation on the data volume 108 at the target path 306 of the container 104. The OS 152 may determine whether the target path 306 is associated with the reference to the source path in the system volume 106 of the container 104. Responsive to determining that the target path 306 is associated with the reference to the source path 304, the OS 152 may determine whether the source path 304 includes the attribute 116 that indicates the source path 304 in the system volume 106 is the link 302 to the target path 306 in the data volume. Responsive to determining that the source path 304 includes the attribute 116 that indicates the source path 304 in the system volume 106 is the link 302 to the target path 306 in the data volume 108, the OS 152 may allow the file system operation to be performed on the data volume 108 at the target path 306 of the container 104.

Figure 5:
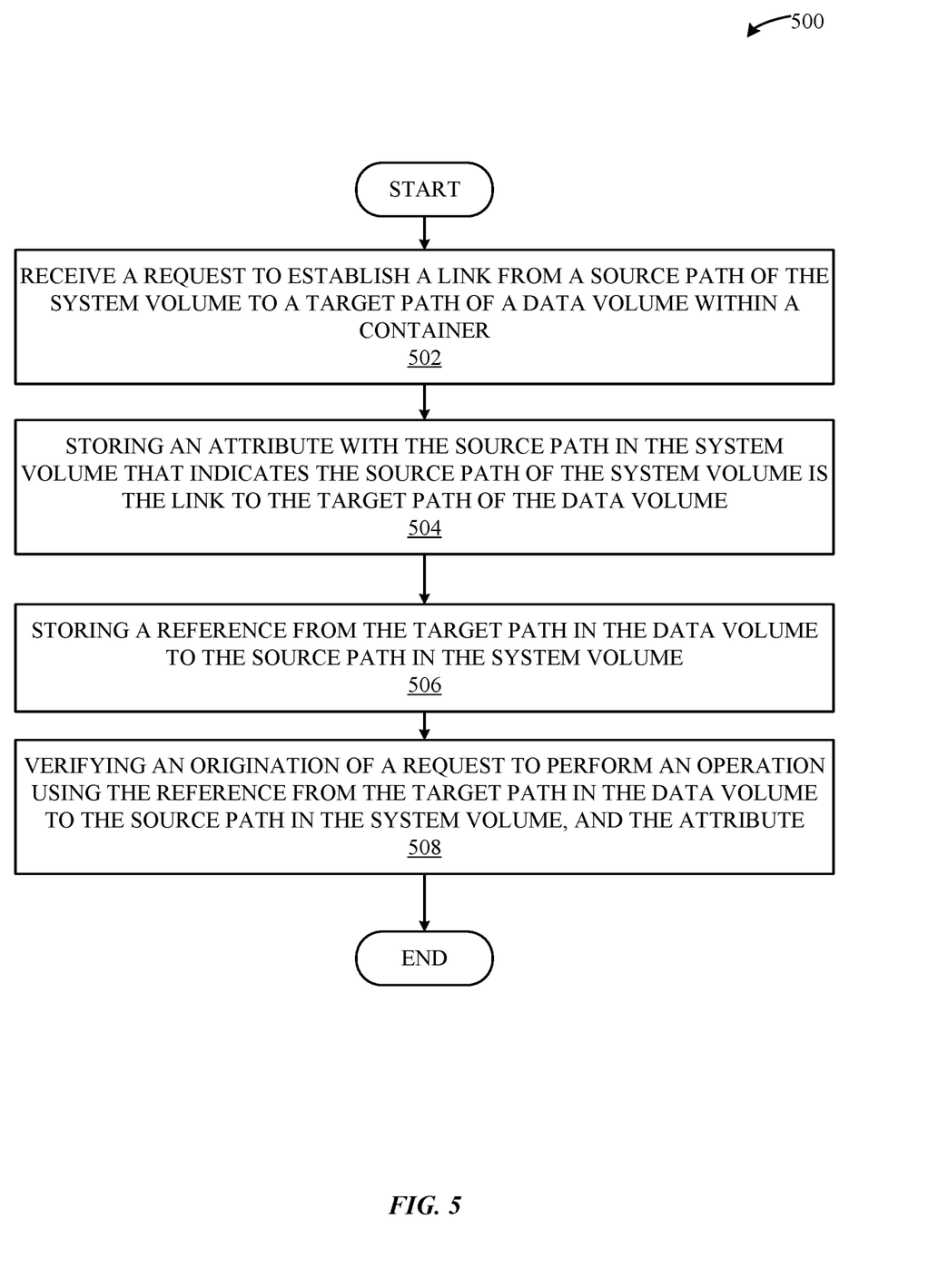
FIG. 5 illustrates a method for establishing a firmlink from a source path of a system volume within a container to a target path of a data volume within the container within the storage device of the computing device of FIG. 1, according to some embodiments.

FIG. 5 illustrates a method for establishing a link from a source path of a system volume within a container to a target path of a data volume within the container within the storage device of the computing device of FIG. 1, according to some embodiments. In the following description, the method 500 is carried out by an entity that is executing on the computing device 101, e.g., the OS 152. However, it is noted that other entities can be configured to carry out the method 500 without departing from the scope of this disclosure, e.g., a bootstrap OS executing on the computing device 101, an external entity configured to communicate with the computing device 101, the volume manager 110, and the like.

As shown in FIG. 5, the method 500 begins at step 502, where the OS 152 receives a request to establish a link 302 (e.g., firmlink) from the source path 304 of the system volume 106 to the target path 306 of the data volume 108 within the container 104. At step 504, the OS 152 stores an attribute 116 with the source path 304 in the system volume 106 that indicates the source path 304 of the system volume 106 is the link 302 to the target path 306 of the data volume 108. In some embodiments, more than one attribute 116 may be stored with the source path 304 (e.g., one attribute 116 indicates the source path 304 is the link 302 and another attribute 116 indicates the target path 306 to which the link 302 points).

At step 506, the OS 152 stores a reference 154 from the target path 306 in the data volume 108 to the source path 304 in the system volume 106. The OS 152 may also store a reference 154 from the source path 304 in the system volume 106 to the target path 306 in the data volume 108. The references 154 may be bi-directional between the source path 304 and the target path 306.

At step 508, the OS 152 verifies an origination of a request to perform an operation using the reference 154 and the attribute 116. This step 508 may further include the OS 152 receiving the target path 306 at which to perform the operation in the data volume 108 of the container 104, determining whether the target path 306 is associated with the reference 154 to the source path 304 in the system volume 106 of the container 104, and responsive to determining that the target path 306 is associated with the reference to the source path 304, determining whether the source path 304 includes the attribute 116 that indicates the source path 304 in the system volume 106 is the link 30 to the target path 306 in the data volume 108. Responsive to determining that the source path 304 includes the attribute 116 indicating the source path 304 is a link 302, then the OS 152 may allow the operation to be performed on the data volume 108 of the container 104 at the target path 306. Responsive to determining that the source path 304 does not include the attribute 116 indicating the source path 304 is a link 302, then the OS 152 may prevent the operation from performing.

In some embodiments, the OS 152 may establish the system volume 106 and the data volume 108 within the container 104 by receiving a request to establish the system volume 106 and the data volume 108 within the container 104. The OS 152 may determine that the system volume 106 and the data volume 108 are associated with a specific volume group 308 and assign a data role to the data volume 108 and a system role to the system volume 106 based on relationship between the system volume 106 and the data volume 108 that is defined by the specific volume group 308. The OS 152 may also establish the system volume 106 having the system role and the data volume 108 having the data role within the container 104.

In some embodiments, the system volume 106 and the data volume 108 are exclusively related for an instance of an OS within the container 104, and another system volume 106-2 and another data volume 108-2 are exclusively related for another instance of the OS within the container 104. The system volumes 106 may be read-only and the data volumes 108 may be read-write in the container 104.

In some embodiments, the OS 152 may receive a request for a path of a file stored at a location having at least the target path (e.g. "/local applications/Mail.app"). The OS 152 may report, based on the reference, that the path of the file includes the source path (e.g., "/applications/Mail.app"). Reporting may refer to transmitting a message indicating that the path of the file includes the source path.

Figure 6:
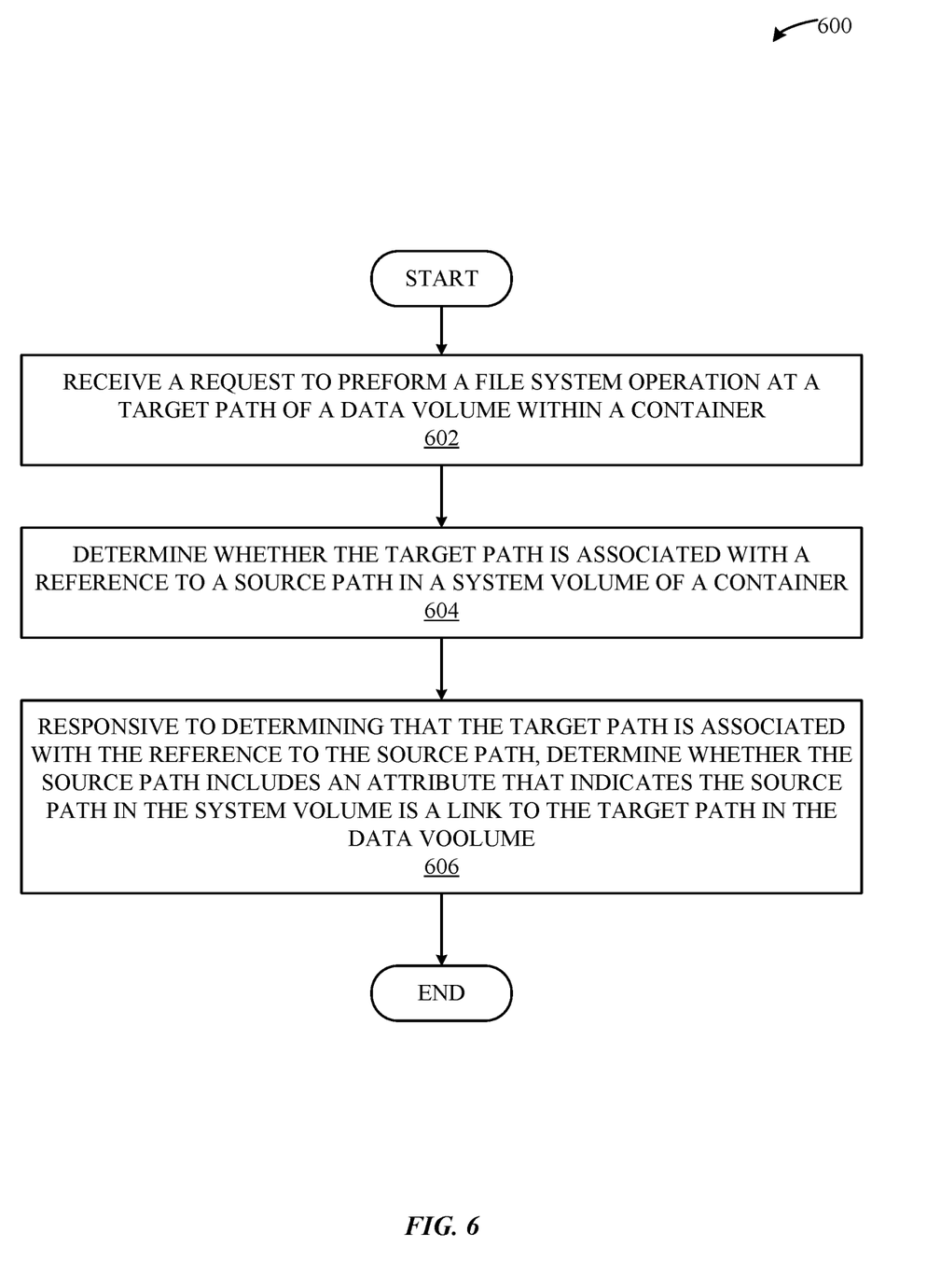
FIG. 6 illustrates a method for determining whether to allow a file system operation on a data volume of a container within the storage device of the computing device of FIG. 1, according to some embodiments.

FIG. 6 illustrates a method for determining whether to allow a file system operation on a data volume of a container within the storage device of the computing device of FIG. 1, according to some embodiments. In the following description, the method 600 is carried out by an entity that is executing on the computing device 101, e.g., the OS 152. However, it is noted that other entities can be configured to carry out the method 600 without departing from the scope of this disclosure, e.g., a bootstrap OS executing on the computing device 101, an external entity configured to communicate with the computing device 101, the volume manager 110, and the like.

As shown in FIG. 6, the method 600 begins at step 602, where the OS 152 receives a request to perform the file system operation at a target path 306 of the data volume 108 within the container 104. The request may be received from another application executing on the OS 152. At step 604, the OS 152 determines whether the target path 306 is associated with a reference 154 to a source path 304 in a system volume 106 of the container 104. The OS 152 may reference the memory 150 to search for the reference 154.

At step 606, responsive to determining that the target path 306 is associated with the reference 154 to the source path 304, the OS 152 determines whether the source path 304 includes an attribute 116 that indicates the source path 304 in the system volume 106 is a link 302 (e.g., a firmlink) to the target path 306 in the data volume 108. Responsive to determining that the source path 304 includes the attribute 116, the OS 152 may allow the file system operation to be performed on the data volume 108 at the target path 306. Responsive to determining that the source path 304 does not include the attribute 116, the OS 152 may prevent the file system operation from being performed on the data volume 108 at the target path 306.

In some embodiments, the OS 152 may establish the system volume 106 and the data volume 108 within the container 104 by receiving a request to establish the system volume 106 and the data volume 108 in the container 104, determining that the system volume 106 and the data volume 108 are associated with a specific volume group 308, assigning a data role to the data volume 108 and a system role to the system volume 106 based on a relationship between the system volume 106 and the data volume 108 that is defined by the specific volume group 308. The OS 152 may establish the system volume 106 having the system role and the data volume 108 having the data role within the container 104.

In some embodiments, the OS 152 may establish the link 302 from the source path 304 of the system volume 106 within the container 104 to the target path 306 of the data volume 108 within the container 104 by receiving a request to establish the link 302 from the source path 304 of the system volume 106 to the target path 306 of the data volume 108 within the container 104, storing the attribute 116 with the source path 304 in the system volume 106 that indicates the source path 304 of the system volume 106 is the link 302 to the target path 306 of the data volume 108, and storing the reference 154 from the target path 306 in the data volume 108 to the source path 304 in the system volume 106.

Figure 7:
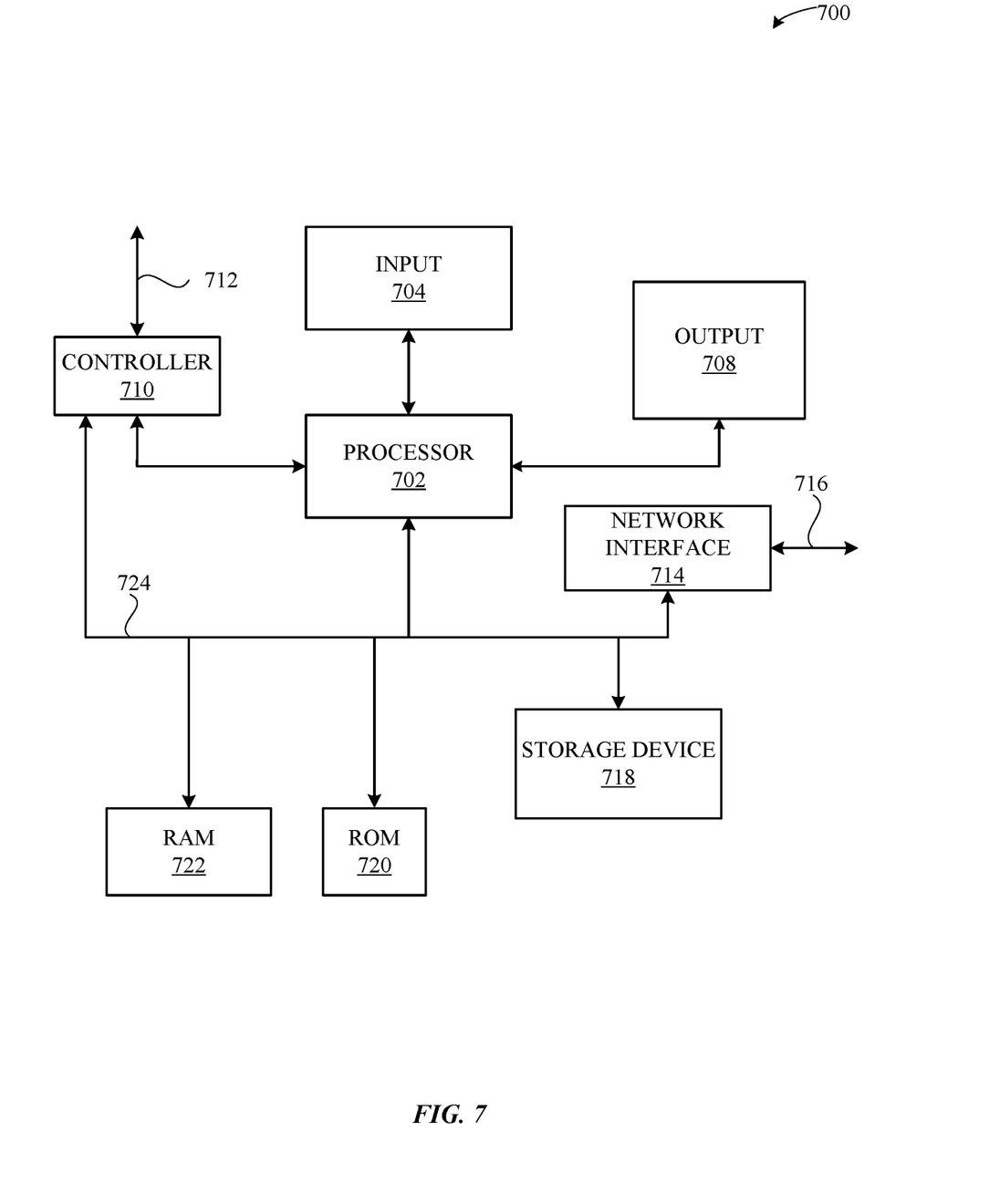
FIG. 7 is a block diagram of a computing device that can represent the components of a computing device or any other suitable device or component for realizing any of the methods, systems, apparatus, and embodiments described herein.

FIG. 7 is a block diagram of a computing device 700 that can represent the components of the computing device 101 (of FIG. 1) or any other suitable device or component for realizing any of the methods, systems, apparatus, and embodiments described herein. It will be appreciated that the components, devices or elements illustrated in and described with respect to FIG. 7 may not be mandatory and thus some may be omitted in certain embodiments. As shown in FIG. 7, the computing device 700 can include a processor 702 that represents a microprocessor, a coprocessor, circuitry and/or a controller for controlling the overall operation of computing device 700. Although illustrated as a single processor, it can be appreciated that the processor 702 can include a plurality of processors. The plurality of processors can be in operative communication with each other and can be collectively configured to perform one or more functionalities of the computing device 700 as described herein. In some embodiments, the processor 702 can be configured to execute instructions that can be stored at the computing device 700 and/or that can be otherwise accessible to the processor 702. As such, whether configured by hardware or by a combination of hardware and software, the processor 702 can be capable of performing operations and actions in accordance with embodiments described herein.

The computing device 700 can also include user input device 704 that allows a user of the computing device 700 to interact with the computing device 700. For example, user input device 704 can take a variety of forms, such as a button, keypad, dial, touch screen, audio input interface, visual/image capture input interface, input in the form of sensor data, etc. Still further, the computing device 700 can include an output 708 that can be controlled by processor 702. The output 708 can include a display device, audio device, haptic feedback device, or any other output device suitable for providing output to a user of a device. Controller 710 can be used to interface with and control different equipment through equipment control bus 712. The computing device 700 can also include a network/bus interface 714 that couples to data link 716. Data link 716 can allow the computing device 700 to couple to a host computer or to accessory devices. The data link 716 can be provided over a wired connection or a wireless connection. In the case of a wireless connection, network/bus interface 714 can include a wireless transceiver.

The computing device 700 can also include a storage device 718, which can have a single disk or a plurality of disks (e.g., hard drives) and a storage management module that manages one or more partitions within the storage device 718. In some embodiments, the storage device 718 can include flash memory, semiconductor (solid state) memory or the like. Still further, the computing device 700 can include Read-Only Memory (ROM) 720 and Random Access Memory (RAM) 722. The ROM 720 can store programs, code, instructions, utilities or processes to be executed in a non-volatile manner. The RAM 722 can provide volatile data storage, and store instructions related to components of the storage management module that are configured to carry out the various techniques described herein. The computing device 700 can further include data bus 724. Data bus 724 can facilitate data and signal transfer between at least processor 702, controller 710, network/bus interface 714, storage device 718, ROM 720, and RAM 722.

Embodiments

The embodiments set forth a method for establishing a system volume and a data volume within a container. According to some embodiments, the method includes the steps of: (1) receiving a request to establish the system volume and the data volume within the container, (2) determining that the system volume and the data volume are associated with a specific volume group, wherein the specific volume group defines an exclusive relationship between the system volume and the data volume within the container, (3) assigning a data role to the data volume and a system role to the system volume based on the exclusive relationship defined by the specific volume group, and (4) establishing the system volume having the system role and the data volume having the data role within the container.

In some embodiments, other steps may include receiving a second request to establish a second system volume and a second data volume within the container, determining that the second system volume and the second data volume are associated with a second specific volume group, where the second specific volume group defines a second exclusive relationship between the second system volume and the second data volume within the container, assigning a second data role to the second data volume and a second system role to the second system volume based on the second exclusive relationship defined by the second specific volume group, and establishing the second system volume having the second system role and the second data volume having the second data role within the container.

In some embodiments, other steps may include receiving a request to establish a link from a source path of the system volume to a target path of the data volume within the container, storing an attribute with the source path in the system volume that indicates the source path of the system volume is the link to the target path of the data volume, and storing a reference from the target path in the data volume to the source path in the system volume. Additionally, other steps may include receiving a request to perform a file system operation on the data volume at the target path of the container, determining whether the target path is associated with the reference to the source path in the system volume of the container, and responsive to determining that the target path is associated with the reference to the source path, determining whether the source path comprises the attribute that indicates the source path in the system volume is the link to the target path in the data volume. Also, other steps may include, responsive to determining that the source path comprises the attribute, allowing the file system operation to be performed on the data volume at the target path of the container.

In some embodiments, creating the reference from the target path in the data volume to the source path in the system volume comprises: creating the reference at runtime and storing the reference in memory. In some embodiments, the system role at least indicates that the system volume is read-only and the data role indicates that the data volume is read-write. In some embodiments, determining that the system volume and the data volume are associated with a specific volume group comprises: identifying the specific volume group in a respective superblock of the system volume and the data volume.

It is noted that the foregoing method steps can be implemented in any order, and that different dependencies can exist among the various limitations associated with the method steps.

The embodiments additionally set forth a method for establishing a link from a source path of a system volume within a container to a target path of a data volume within the container. According to some embodiments, the method includes the steps of: (1) receiving a request to establish the link from the source path of the system volume to the target path of the data volume within the container, (2) storing an attribute with the source path in the system volume that indicates the source path of the system volume is the link to the target path of the data volume, (3) store a reference from the target path in the data volume to the source path in the system volume, and (4) verify an origination of a request to perform an operation using the reference and the attribute.

In some embodiments, verifying the origination of the request to perform an operation comprises: receiving the target path at which to perform the operation in the data volume of the container, determining whether the target path is associated with the reference to the source path in the system volume of the container, and responsive to determining that the target path is associated with the reference to the source path, determining whether the source path comprises the attribute that indicates the source path in the system volume is the link to the target path in the data volume. In some embodiments, responsive to determining that the source path comprises the attribute, the operation may be allowed to be performed on the data volume of the container.

In some embodiments, other steps may include establishing the system volume and the data volume within the container by: receiving a request to establish the system volume and the data volume in the container, determining that the system volume and the data volume are associated with a specific volume group, assigning a data role to the data volume and a system role to the system volume based on a relationship between the system volume and the data volume that is defined by the specific volume group, and establishing the system volume having the system role and the data volume having the data role within the container. In some embodiments, the system volume and the data volume are exclusively related for an instance of an OS within the container, and another system volume and another data volume are exclusively related for another instance of the OS within the container. In some embodiments, the system volume is read-only and the data volume is read-write.

It is noted that the foregoing method steps can be implemented in any order, and that different dependencies can exist among the various limitations associated with the method steps.

The embodiments additionally set forth a method for determining whether to allow a file system operation on a data volume of a container. According to some embodiments, the method includes the steps of: (1) receiving a request to perform the file system operation at a target path of the data volume within the container, (2) determining whether the target path is associated with a reference to a source path in a system volume of the container, and (3) responsive to determining that the target path is associated with the reference to the source path, determining whether the source path comprises an attribute that indicates the source path in the system volume is a link to the target path in the data volume.

In some embodiments, responsive to determining that the source path comprises the attribute, the file system operation may be allowed to be performed on the data volume. In some embodiments, responsive to determining that the source path does not comprise the attribute, the file system operation may be prevented from being performed on the data volume. In some embodiments, other steps may include establishing the system volume and the data volume within the container by: receiving a request to establish the system volume and the data volume in the container, determining that the system volume and the data volume are associated with a specific volume group, assigning a data role to the data volume and a system role to the system volume based on a relationship between the system volume and the data volume that is defined by the specific volume group, and establishing the system volume having the system role and the data volume having the data role within the container.

In some embodiments, other steps include establishing the link from the source path of the system volume within the container to the target path of the data volume within the container, by: receiving a request to establish the link from the source path of the system volume to the target path of the data volume within the container, storing the attribute with the source path in the system volume that indicates the source path of the system volume is the link to the target path of the data volume, and storing the reference from the target path in the data volume to the source path in the system volume. In some embodiments, other steps include determining that the data volume and the system volume are related based on sharing a specific volume group.

According to some embodiments, the steps further include: deleting a current FS volume that is to be replaced by the FS volume. In some embodiments, the current FS volume is associated with a current version of an operating system (OS), and the FS volume is associated with an updated version of the OS. According to some embodiments, the steps further include, subsequent to replacing the first metadata of the new FS volume with the second metadata of the FS volume: updating the second metadata to properly reference content included in the image of the FS volume. In some embodiments, the container is configured to manage a plurality of FS volumes. In some embodiments, the new FS volume is included in the plurality of FS volumes prior to replacing the first metadata with the second metadata, and the new FS volume is excluded from the plurality of FS volumes subsequent to replacing the first metadata with the second metadata.

It is noted that the foregoing method steps can be implemented in any order, and that different dependencies can exist among the various limitations associated with the method steps.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for establishing a system volume and a data volume within a container, the method comprising:
   receiving a request to establish the system volume and the data volume within the container;
   determining that the system volume and the data volume are associated with a specific volume group, wherein the specific volume group defines an exclusive relationship between the system volume and the data volume within the container;
   assigning a data role to the data volume and a system role to the system volume based on the exclusive relationship defined by the specific volume group; and
   establishing the system volume having the system role and the data volume having the data role within the container.

2. The method of claim 1, further comprising:
   receiving a second request to establish a second system volume and a second data volume within the container;
   determining that the second system volume and the second data volume are associated with a second specific volume group, wherein the second specific volume group defines a second exclusive relationship between the second system volume and the second data volume within the container;
   assigning a second data role to the second data volume and a second system role to the second system volume based on the second exclusive relationship defined by the second specific volume group; and
   establishing the second system volume having the second system role and the second data volume having the second data role within the container.

3. The method of claim 1, further comprising:
   receiving a request to establish a link from a source path of the system volume to a target path of the data volume within the container;
   storing an attribute with the source path in the system volume that indicates the source path of the system volume is the link to the target path of the data volume; and
   storing a reference from the target path in the data volume to the source path in the system volume.

4. The method of claim 3, further comprising:
   receiving a request to perform a file system operation on the data volume at the target path of the container;
   determining whether the target path is associated with the reference to the source path in the system volume of the container; and
   responsive to determining that the target path is associated with the reference to the source path, determining whether the source path comprises the attribute that indicates the source path in the system volume is the link to the target path in the data volume.

5. The method of claim 4, further comprising:
   responsive to determining that the source path comprises the attribute, allowing the file system operation to be performed on the data volume at the target path of the container.

6. The method of claim 3, wherein storing the reference from the target path in the data volume to the source path in the system volume further comprises:
   creating the reference at runtime; and
   storing the reference in memory.

7. The method of claim 1, wherein the system role at least indicates that the system volume is read-only and the data role at least indicates that the data volume is read-write.

8. The method of claim 1, wherein determining that the system volume and the data volume are associated with a specific volume group further comprises identifying the specific volume group in a respective superblock of the system volume and the data volume.

9. A computing device configured to establish a link from a source path of a system volume within a container to a target path of a data volume within the container, the computing device comprising:
   at least one processor; and
   at least one memory configured to store instructions that, when executed by the at least one processor, cause the computing device to:
   receive a request to establish the link from the source path of the system volume to the target path of the data volume within the container;
   store an attribute with the source path in the system volume that indicates the source path of the system volume is the link to the target path of the data volume;
   store a reference from the target path in the data volume to the source path in the system volume; and verify an origination of a request to perform an operation using the reference and the attribute.

10. The computing device of claim 9, wherein to verify the origination of the request to perform an operation, the at least one processor further causes the computing device to:
receive the target path at which to perform the operation in the data volume of the container;
determine whether the target path is associated with the reference to the source path in the system volume of the container; and
responsive to determining that the target path is associated with the reference to the source path, determine whether the source path comprises the attribute that indicates the source path in the system volume is the link to the target path in the data volume.

11. The computing device of claim 10, wherein the at least one processor further causes the computing device to:
responsive to determining that the source path comprises the attribute, allow the operation to be performed on the data volume of the container.

12. The computing device of claim 9, wherein the at least one processor further causes the computing device to:
establish the system volume and the data volume within the container by:
receiving a request to establish the system volume and the data volume in the container;
determining that the system volume and the data volume are associated with a specific volume group;
assigning a data role to the data volume and a system role to the system volume based on a relationship between the system volume and the data volume that is defined by the specific volume group; and
establishing the system volume having the system role and the data volume having the data role within the container.

13. The computing device of claim 9, wherein the system volume and the data volume are exclusively related for an instance of an operating system within the container, and another system volume and another data volume are exclusively related for another instance of the operating system within the container.

14. The computing device of claim 9, wherein the at least one processor further causes the computing device to:
receive a request for a path of a file stored at a location having at least the target path;
report, based on the reference, that the path of the file includes the source path.

15. At least one non-transitory computer readable storage medium configured to store instructions that, when executed by at least one processor included in a computing device, cause the computing device to determine whether to allow a file system operation on a data volume of a container, by:
receiving a request to perform the file system operation at a target path of the data volume within the container;
determining whether the target path is associated with a reference to a source path in a system volume of the container; and
responsive to determining that the target path is associated with the reference to the source path, determining whether the source path comprises an attribute that indicates the source path in the system volume is a link to the target path in the data volume.

16. The at least one non-transitory computer readable storage medium of claim 15, further comprising:
responsive to determining that the source path comprises the attribute, allowing the file system operation to be performed on the data volume.

17. The at least one non-transitory computer readable storage medium of claim 15, further comprising:
responsive to determining that the source path does not comprise the attribute, preventing the file system operation from being performed on the data volume.

18. The at least one non-transitory computer readable storage medium of claim 15, further comprising:
establishing the system volume and the data volume within the container by:
receiving a request to establish the system volume and the data volume in the container;
determining that the system volume and the data volume are associated with a specific volume group;
assigning a data role to the data volume and a system role to the system volume based on a relationship between the system volume and the data volume that is defined by the specific volume group; and
establishing the system volume having the system role and the data volume having the data role within the container.

19. The at least one non-transitory computer readable storage medium of claim 15, further comprising establishing the link from the source path of the system volume within the container to the target path of the data volume within the container, by:
receiving a request to establish the link from the source path of the system volume to the target path of the data volume within the container;
storing the attribute with the source path in the system volume that indicates the source path of the system volume is the link to the target path of the data volume; and
storing the reference from the target path in the data volume to the source path in the system volume.

20. The at least one non-transitory computer readable storage medium of claim 15, further comprising determining that the data volume and the system volume are related based on sharing a specific volume group.

* * * * *